US012742500B2

(12) United States Patent
Osumi et al.

(10) Patent No.: US 12,742,500 B2
(45) Date of Patent: Sep. 22, 2026

(54) ANNULAR SEAL MATERIAL AND MANUFACTURING METHOD

(71) Applicant: VALQUA, LTD., Tokyo (JP)

(72) Inventors: Naoki Osumi, Gojo (JP); Tomomitsu Mochizuki, Gojo (JP); Miki Otsuka, Gojo (JP)

(73) Assignee: VALQUA, LTD., Tokyo (JP)

( * ) Notice: Subject to any disclaimer, the term of this patent is extended or adjusted under 35 U.S.C. 154(b) by 0 days.

(21) Appl. No.: 18/847,053

(22) PCT Filed: Mar. 15, 2023

(86) PCT No.: PCT/JP2023/010022
§ 371 (c)(1),
(2) Date: Sep. 13, 2024

(87) PCT Pub. No.: WO2023/189585
PCT Pub. Date: Oct. 5, 2023

(65) Prior Publication Data
US 2025/0198517 A1 Jun. 19, 2025

(30) Foreign Application Priority Data
Mar. 30, 2022 (JP) ................................ 2022-056235

(51) Int. Cl.
*F16J 15/3284* (2016.01)
*B29C 69/02* (2006.01)
(Continued)

(52) U.S. Cl.
CPC ........... *F16J 15/3284* (2013.01); *B29C 69/02* (2013.01); *F16J 15/10* (2013.01); *F16J 15/328* (2013.01)

(58) Field of Classification Search
CPC ........ F16J 15/10; F16J 15/328; F16J 15/3284; B29C 69/02
See application file for complete search history.

(56) References Cited

U.S. PATENT DOCUMENTS 2,961,713 A * 11/1960 Hartley ............... B29C 33/0022 264/161
2005/0218606 A1 10/2005 Sakazaki et al.
(Continued)

FOREIGN PATENT DOCUMENTS

CN 101861274 B 9/2015
CN 106363942 B 8/2018
(Continued)

OTHER PUBLICATIONS

International Search Report dated Apr. 25, 2023, issued in counterpart International application No. PCT/JP2023/010022, with English translation. (5 pages).
(Continued)

*Primary Examiner* — Gilbert Y Lee
(74) *Attorney, Agent, or Firm* — WHDA, LLP

(57) ABSTRACT

The present invention relates to an annular seal material comprising a core and an outer layer covering a periphery of the core, wherein the core and the outer layer comprises a crosslinked product of a crosslinkable rubber composition having a different color from each other either after hot press molding or after secondary crosslinking or both. According to the present invention, provided are an annular seal material that can be mass-produced by using different materials for a core and an outer layer, respectively, and a method for producing the same.

8 Claims, 1 Drawing Sheet

(51) Int. Cl.
*F16J 15/10* (2006.01)
*F16J 15/328* (2016.01)

(56) References Cited

U.S. PATENT DOCUMENTS

| | | | |
|---|---|---|---|
| 2015/0080517 | A1 | 3/2015 | Chen |
| 2015/0080520 | A1 | 3/2015 | Chen |
| 2019/0309199 | A1 | 10/2019 | Osumi et al. |

FOREIGN PATENT DOCUMENTS

| | | | |
|---|---|---|---|
| JP | H04-83976 | A | 3/1992 |
| JP | H10-052885 | A | 2/1998 |
| JP | H10-323847 | A | 12/1998 |
| JP | H10-329271 | A | 12/1998 |
| JP | 2001-208204 | A | 8/2001 |
| JP | 2003-097715 | A | 4/2003 |
| JP | 2004-160901 | A | 6/2004 |
| JP | 2005-282820 | A | 10/2005 |
| JP | 4148493 | B2 | 9/2008 |
| JP | 2011-208204 | A | 10/2011 |
| JP | 2019-108913 | A | 7/2019 |
| JP | 6618507 | B2 | 12/2019 |
| TW | 1635118 | B | 9/2018 |
| WO | 2009/063095 | A2 | 5/2009 |

OTHER PUBLICATIONS

Office Action dated Jul. 15, 2025, issued in counterpart JP Application No. 2022-056235, with English translation. (6 pages).
Office Action dated Mar. 17, 2026, issued in counterpart JP Application No. 2022-056235, with English translation. (5 pages).
Office Action dated May 29, 2026, issued in counterpart TW Application No. 112111699, with English translation. (15 pages).

* cited by examiner

ANNULAR SEAL MATERIAL AND MANUFACTURING METHOD

TECHNICAL FIELD

The present invention relates to an annular seal material, and further also relates to a method for manufacturing the same.

BACKGROUND ART

Japanese Patent No. 4148493 (PTL 1) discloses a method for manufacturing a composite structure O-ring, and discloses that a composite structure material produced by inserting an inner layer portion formed into a string into an inner space of a tube-like outer layer portion is cut and set in an O-ring mold, and then a material used for the outer layer portion shaped into a string is set in a gap between cut surfaces of the composite structure material, and pressurized, heated, and molded.

Japanese Patent Laying-Open No. 10-323847 (PTL 2) discloses a method for manufacturing a composite structure O-ring, including preforming two coating materials by using an insert having substantially the same shape as a core material, removing the insert, then inserting a supercritically extracted O-ring-like rubber core material in the cavity, and integrally molding the same together with the coating materials.

Japanese Patent Laying-Open No. 10-52885 (PTL 3) discloses a method for manufacturing a two-layer structure O-ring, characterized by extruding a string-like body constituted of an outer layer portion and an inner layer portion and hot pressing the string-like body to simultaneously vulcanize the inner and outer layers.

Japanese Patent Laying-Open No. 10-329271 (PTL 4) discloses, as a method for manufacturing an O-ring having a two-layer structure, a manufacturing method involving forming an outer layer material including a perfluoroelastomer into a ribbon and winding the same around a core material to heat and pressurize the resulting core material; and a manufacturing method involving freeze-pulverizing an outer layer material to form a particle, attaching the particle to a core material, and then heating and pressurizing the resulting core material.

CITATION LIST

Patent Literature

PTL 1: Japanese Patent No. 4148493
PTL 2: Japanese Patent Laying-Open No. 10-323847
PTL 3: Japanese Patent Laying-Open No. 10-52885
PTL 4: Japanese Patent Laying-Open No. 10-329271

SUMMARY OF INVENTION

Technical Problem

In the manufacturing method disclosed in Japanese Patent No. 4148493 (PTL 1), the outer layer portion material may break when the outer layer portion is inflated. In addition, a connecting member made of the outer layer portion material is disposed at a seam, and thus the layer configuration at the seam does not have a two-layer structure. Furthermore, the process is complicated and costly.

In the manufacturing method disclosed in Japanese Patent Laying-Open No. 10-323847 (PTL 2), the core material may protrude from the gap between the upper and lower outer layers during integral molding in the mold.

In the manufacturing method disclosed in Japanese Patent Laying-Open No. 10-52885 (PTL 3), the inner layer portion may protrude from a parting line and the seam during molding in the mold.

In the manufacturing method disclosed in Japanese Patent Laying-Open No. 10-329271 (PTL 4), simply forming an outer layer material into a ribbon and winding the same causes a wrinkle to occur in a curved portion of the inner diameter of the O-ring when fed into the mold, and thus it is difficult to feed the material. In addition, the core material is highly likely to protrude from a gap in the ribbon, and it is difficult to take measures thereagainst. Furthermore, when an outer layer material is freeze-pulverized to form a particle and the particle is attached to a core material, simply forming a particle does not cause the particle to adhere to the core material, and thus it is difficult to completely cover the core.

When an annular seal material having a two-layer structure is manufactured by using different materials for a core and an outer layer, respectively, the core may protrude from the outer layer at a seam and a parting line, but the core and the outer layer have the same or a similar color and thus it is often impossible or difficult to confirm the above protrusion.

An object of the present invention is to provide an annular seal material that makes it easy to recognize protrusion of a core from an outer layer at a seam and a parting line when an annular seal material having a two-layer structure is manufactured by using different materials for the core and the outer layer, respectively, and a method for manufacturing the same.

Solution to Problem

The present invention provides the following annular seal material and method for manufacturing the same.

[1] An annular seal material comprising a core and an outer layer covering a periphery of the core, wherein the core and the outer layer comprises a crosslinked product of a crosslinkable rubber composition having a different color from each other either after hot press molding or after secondary crosslinking or both.

[2] The annular seal material according to [1], wherein the annular seal material has an average ratio of a thickness of the outer layer to the whole cross-sectional thickness of 1/35 to 1/4.

[3] The annular seal material according to [1] or [2], wherein at least one of the core and the outer layer comprises a colorant.

[4] The annular seal material according to [3], wherein the core comprises a colorant and the outer layer does not comprise a colorant.

[5] The annular seal material according to [3] or [4], wherein the colorant is at least one selected from the group consisting of an inorganic pigment and an organic pigment.

[6] The annular seal material according to any one of [1] to [5], wherein the outer layer comprises a crosslinked product of at least one selected from the group consisting of a perfluoroelastomer and a fluororubber, and the core comprises a crosslinked product of at least one selected from the group consisting of a perfluoroelastomer, a fluororubber, silicone rubber, and fluorosilicone rubber.

[7] A method for manufacturing the annular seal material according to [1], comprising:

providing a preform comprising an uncrosslinked core made of a crosslinkable rubber composition for a core, and an uncrosslinked outer layer, made of a crosslinkable rubber composition for an outer layer, covering a periphery of the uncrosslinked core; and placing the preform in a mold to carry out hot press molding, wherein the crosslinkable rubber composition for a core and the crosslinkable rubber composition for an outer layer have a different color from each other either after hot press molding or after secondary crosslinking or both.

[8] The method for manufacturing the annular seal material according to [7], wherein the providing a preform comprises carrying out extrusion using the crosslinkable rubber composition for a core and the crosslinkable rubber composition for an outer layer.

[9] The method according to [7] or [8], wherein the preform is rope-like.

Advantageous Effects of Invention

According to the present invention, it is possible to provide an annular seal material that makes it easy to recognize protrusion of a core from an outer layer at a seam and a parting line when an annular seal material having a two-layer structure is manufactured by using different materials for the core and the outer layer, respectively, and a method for manufacturing the same.

DESCRIPTION OF EMBODIMENTS

Figure 1:
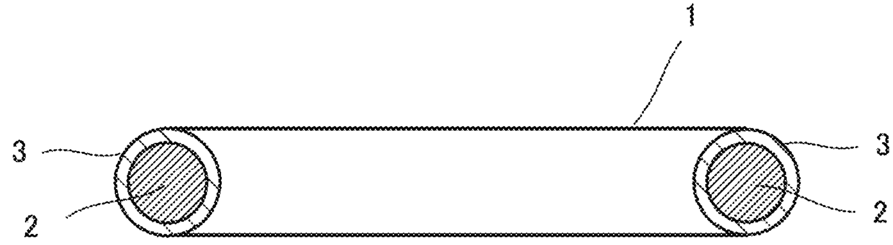
FIG. 1 is a schematic cross-sectional view of an annular seal material according to one embodiment of the present invention.

Hereinafter, embodiments of the present invention will be described with reference to the drawings, but the present invention is not limited to the following embodiments. In all the drawings below, the scale of each constituent is adjusted appropriately to facilitate understanding thereof, and the scale of each constituent shown in the drawings does not necessarily match the scale of the actual constituent.

Annular Seal Material

An annular seal material according to one embodiment of the present invention includes a core and an outer layer covering the periphery of the core, wherein the core and the outer layer includes a crosslinked product of a crosslinkable rubber composition having a different color from each other either after hot press molding or after secondary crosslinking or both. The annular seal material will be described with reference to the drawings.

FIG. 1 is a cross-sectional view of the annular seal material. An annular seal material 1 shown in FIG. 1 includes a core 2 and an outer layer 3 covering the periphery of core 2. As shown in FIG. 1, annular seal material 1 preferably has a circular cross-sectional shape, and may have a further cross-sectional shape depending on the application.

Figure 2:
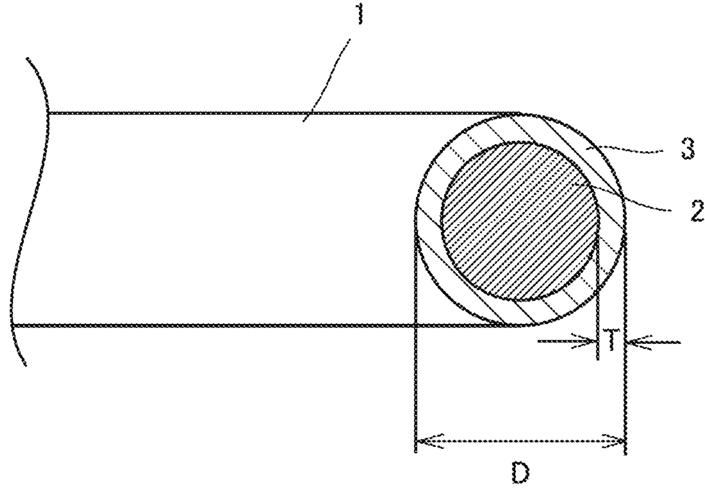
FIG. 2 is a schematic cross-sectional view of an annular seal material according to one embodiment of the present invention.

Annular seal material 1 has an average ratio of the thickness of outer layer 3 to the whole cross-sectional thickness (hereinafter also referred to as an average ratio) of preferably 1/50 to 1/3, and more preferably 1/35 to 1/4. The average ratio is the average of the ratios measured in cross sections of the annular seal material at two or more randomly selected points other than the seam. The ratio is, for example, the ratio T/D of a maximum thickness T of outer layer 3 to a cross-sectional diameter D of annular seal material 1 including that thickness in a cross section of annular seal material 1 in FIG. 2.

The thickness T of outer layer 3 may be, for example, 0.1 to 10 mm, and is preferably 0.2 to 3 mm. The cross-sectional diameter D of seal material 1 may be, for example, 3 to 50 mm, and is preferably 3 to 15 mm.

When a crosslinkable rubber composition for forming core 2 (hereinafter also referred to as a crosslinkable rubber composition for a core) and a crosslinkable rubber composition for forming outer layer 3 (hereinafter referred to as a crosslinkable rubber composition for an outer layer) have a different color from each other either after hot press molding or after secondary crosslinking or both, protrusion of core 2 from outer layer 3 at a seam and a parting line becomes easy to confirm at least either after hot press molding or after secondary crosslinking, and productivity tends to improve easily.

Core 2 and outer layer 3 can have a different color from each other either after hot press molding or after secondary crosslinking or both by, for example, selecting the types of raw materials included in the crosslinkable rubber composition for a core and the crosslinkable rubber composition for an outer layer (hereinafter also referred to as the crosslinkable rubber composition when both are collectively referred to) or regulating the blending ratio of the raw materials.

When the types of raw materials are selected such that core 2 and outer layer 3 exhibit a different color from each other after hot press molding or after secondary crosslinking, at least one of the crosslinkable rubber compositions can include a colorant. Therefore, at least one of core 2 and outer layer 3 may include a colorant. When at least one of the crosslinkable rubber compositions includes a colorant, preferably core 2 includes the colorant and outer layer 3 does not include the colorant. When both core 2 and outer layer 3 include a colorant, core 2 and outer layer 3 preferably include a different colorant from each other. It is also possible to cause core 2 and outer layer 3 to exhibit a different color from each other after hot press molding or after secondary crosslinking without blending a pigment into the crosslinkable rubber composition.

The crosslinkable rubber composition for a core and the crosslinkable rubber composition for an outer layer may have the same color or a different color from each other before hot press molding or before secondary crosslinking. In addition, the colors of the crosslinkable rubber composition for a core and the crosslinkable rubber composition for an outer layer may each be the same or different after hot press molding or after secondary crosslinking as compared with before hot press molding or before secondary crosslinking.

The colorant may be a colorant conventionally used for a seal material. Examples of the colorant include at least one selected from the group consisting of an inorganic pigment and an organic pigment.

Examples of the inorganic pigment include a white pigment (for example, silica, zinc white, lead white, lithopone, titanium dioxide, precipitated barium sulfate, or a barite powder), a red pigment (for example, red lead or iron oxide red), a yellow pigment (for example, chrome yellow or zinc yellow), a blue pigment (for example, ultramarine blue, Prussian blue, or YInMn blue), and a black pigment (for example, carbon black).

Examples of the organic pigment include an azo pigment (an azo lake pigment, an insoluble azo pigment, a condensed azo pigment, or the like); a polycyclic pigment such as an anthraquinone-based pigment, a thioindigo-based pigment, a perinone-based pigment, a perylene-based pigment, a quinacridone-based pigment, an isoindolinone pigment, an isoindoline pigment, a dioxazine pigment, a quinophthalone pigment, or a diketopyrrolopyrrole pigment, and a phthalocyanine-based pigment. As the organic pigment, an organic pigment classified as a pigment in the Color Index can be used. A preferably used pigment is an organic pigment that does not contain a metal element. The organic pigment that does not contain a metal element does not have the risk of scattering a substance derived from a metal element even if a seal material is used in a harsh ozone environment such as in a semiconductor application and the annular seal material is etched.

The content of the colorant in the crosslinkable rubber composition may be, for example, 0.01 parts by mass or more and less than 2 parts by mass per 100 parts by mass of the crosslinkable rubber component described later, and from the viewpoint of ease of confirming protrusion of core 2 from outer layer 3 at a seam and a parting line, the content thereof is preferably 0.05 parts by mass or more and 1.5 parts by mass or less, and more preferably 0.1 parts by mass or more and 1 part by mass or less.

The crosslinkable rubber composition can include a crosslinkable rubber component. The crosslinkable rubber component can form an elastomer (crosslinked rubber) having the above crosslinked structure through a crosslinking reaction. The crosslinkable rubber component can have a crosslinkable site such as a carbon-carbon unsaturated group, a nitrile group, a hydroxyl group, an amino group, a carbonyl group, or a halogen group.

Specific examples of the crosslinkable rubber component include a perfluoroelastomer (FFKM), a fluororubber (FKM), silicone rubber, fluorosilicone rubber, ethylene-propylene rubber (EPM), ethylene-propylene-diene rubber (EPDM), nitrile rubber (NBR; acrylonitrile butadiene rubber), hydrogenated nitrile rubber (HNBR; hydrogenated acrylonitrile butadiene rubber), butyl rubber (IIR), and acrylic rubber. Among these, a perfluoroelastomer, a fluororubber, silicone rubber, and fluorosilicone rubbers are suitably used. In the crosslinkable rubber composition, one of the above crosslinkable rubber components may be used alone, or a polymer blend including two or more of the above crosslinkable rubber components may be used.

Outer layer 3 includes a crosslinked product of at least one selected from the group consisting of a perfluoroelastomer and a fluororubber, and core 2 includes a crosslinked product of at least one selected from the group consisting of a perfluoroelastomer, a fluororubber, silicone rubber, and fluorosilicone rubber. Therefore, the crosslinkable rubber component in the crosslinkable rubber composition for an outer layer is preferably at least one selected from the group consisting of a perfluoroelastomer and a fluororubber, and more preferably a perfluoroelastomer. The crosslinkable rubber component in the crosslinkable rubber composition for a core is preferably at least one selected from the group consisting of a perfluoroelastomer, a fluororubber, silicone rubber, and fluorosilicone rubber. Outer layer 3 advantageously includes a crosslinked product of a perfluoroelastomer from the viewpoint of radical resistance. Core 2 advantageously includes a crosslinked product of at least one selected from the group consisting of a fluororubber, silicone rubber, and fluorosilicone rubber from the viewpoint of material cost.

The perfluoroelastomer is not particularly limited, and examples thereof include a tetrafluoroethylene (TFE)-perfluoro(alkyl vinyl ether)-based copolymer and a TFE-perfluoro(alkoxyalkyl vinyl ether)-based copolymer. These copolymers may further include a constitutional unit derived from a further perfluoromonomer. According to a perfluoroelastomer composition including a perfluoroelastomer, ozone resistance can be improved more than a crosslinkable rubber composition including a hydrogen atom-containing fluoroelastomer. The crosslinkable rubber composition may include only one perfluoroelastomer, or may include two or more perfluoroelastomers.

The perfluoro(alkyl vinyl ether) forming a tetrafluoroethylene (TFE)-perfluoro(alkyl vinyl ether)-based copolymer can have 1 to 5 carbon atoms in the alkyl group, and for example, can be perfluoro(methyl vinyl ether), perfluoro (ethyl vinyl ether), perfluoro(propyl vinyl ether), or the like. Perfluoro(methyl vinyl ether) is preferable.

The perfluoro(alkoxyalkyl vinyl ether) forming a TFE-perfluoro(alkoxyalkyl vinyl ether)-based copolymer can have 3 to 12 carbon atoms in the group bonded to the vinyl ether group ($CF_2{=}CFO{-}$), and for example, can be $$CF_2{=}CFOCF_2CF(CF_3)OC_nF_{2n+1},$$

$$CF_2{=}CFO(CF_2)_3OC_nF_{2n+1},$$

$$CF_2{=}CFOCF_2CF(CF_3)O(CF_2O)_mC_nF_{2n+1}, \text{ or}$$

$$CF_2{=}CFO(CF_2)_2OC_nF_{2n+1}.$$

In the above formulas, n is, for example, 1 to 5, and m is, for example, 1 to 3.

The perfluoroelastomer preferably has crosslinkability, and more specifically, the perfluoroelastomer is preferably one obtained by further copolymerizing a crosslinking site monomer (one further including a constitutional unit derived from a crosslinking site monomer). The crosslinking site means a site capable of a crosslinking reaction. Examples of the crosslinking site include a nitrile group, a halogen group (for example, an I group or a Br group), and a perfluorophenyl group.

One example of a crosslinking site monomer having a nitrile group as a crosslinking site is a nitrile group-containing perfluorovinyl ether. Examples of the nitrile group-containing perfluorovinyl ether include $CF_2{=}CFO(CF_2)_nOCF(CF_3)CN$ (wherein n is, for example, 2 to 4), $CF_2{=}CFO(CF_2)_nCN$ (wherein n is, for example, 2 to 12), $CF_2{=}CFO[CF_2CF(CF_3)O]_m(CF_2)_nCN$ (wherein n is, for example, 2, and m is, for example, 1 to 5), $CF_2{=}CFO[CF_2CF(CF_3)O]_m(CF_2)_nCN$ (wherein n is, for example, 1 to 4, and m is, for example, 1 to 2), and $CF_2{=}CFO[CF_2CF(CF_3)O]_nCF_2CF(CF_3)CN$ (wherein n is, for example, 0 to 4).

One example of a crosslinking site monomer having a halogen group as a crosslinking site is a halogen group-containing perfluorovinyl ether. Examples of the halogen group-containing perfluorovinyl ether include the above specific examples of the nitrile group-containing perfluorovinyl ether in which the nitrile group is replaced with a halogen group.

The crosslinkable perfluoroelastomer may have a crosslinked structure that crosslinks two main chains.

The ratio by mol of constitutional unit derived from TFE/constitutional unit derived from a perfluoro (alkyl vinyl ether) or a perfluoro (alkoxyalkyl vinyl ether)/constitutional unit derived from a crosslinking site monomer in a perfluoroelastomer is usually 50 to 79.6%/20 to 49.8%/0.2 to 5%, and preferably 60 to 74.8%/25 to 39.5%/0.5 to 2%. The crosslinkable rubber composition can also include two or more perfluoroelastomers having different ratios of the above constitutional units.

Examples of the fluororubber include a binary vinylidene fluoride-based rubber such as a vinylidene fluoride/hexafluoropropylene copolymer, a ternary vinylidene fluoride-based rubber such as a vinylidene fluoride/tetrafluoroethylene/hexafluoropropylene copolymer, a vinylidene fluoride/tetrafluoroethylene/perfluoroalkyl vinyl ether copolymer, or a vinylidene fluoride/tetrafluoroethylene/propylene copolymer, a tetrafluoroethylene/propylene copolymer, an ethylene/tetrafluoroethylene/perfluoromethyl vinyl ether copolymer, a thermoplastic fluororubber, and a liquid fluororubber having a perfluoropolyether skeleton (for example, "SIFEL (registered trademark)" manufactured by Shin-Etsu Chemical Co., Ltd.). Only one fluororubber may be used alone, or two or more fluororubbers may be used in combination.

The fluororubber may contain a functional group. The functional group can be introduced, for example, by copolymerizing a crosslinking site monomer having the functional group. The crosslinking site monomer can be a halogen group-containing monomer.

The crosslinkable rubber composition can optionally include a crosslinking agent depending on the crosslinking system of the crosslinkable rubber component together with a co-crosslinking agent (crosslinking aid). Examples of a crosslinking system of a perfluoroelastomer include a peroxide crosslinking system, a triazine crosslinking system, an oxazole crosslinking system, an imidazole crosslinking system, a thiazole crosslinking system, and a bisphenol crosslinking system. Examples of a crosslinking system of a vinylidene fluoride-based rubber and tetrafluoroethylene-propylene rubber include a peroxide crosslinking system, a polyamine crosslinking system, and a polyol crosslinking system. The crosslinkable rubber composition may be crosslinked with any one crosslinking system, or may be crosslinked with two or more crosslinking systems.

Examples of the peroxide crosslinking agent include 2,5-dimethyl-2,5-di(t-butylperoxy)hexane (examples of a commercially available product: "PERHEXA 25B" and "PERHEXA 25B-40" manufactured by NOF CORPORATION); dicumyl peroxide (example of a commercially available product: "PERCUMYL D" manufactured by NOF CORPORATION); 2,4-dichlorobenzoyl peroxide; di-t-butyl peroxide; t-butyl dicumyl peroxide; benzoyl peroxide (example of a commercially available product: "NYPER B" manufactured by NOF CORPORATION); 2,5-dimethyl-2,5-(t-butylperoxy)hexyne-3 (example of a commercially available product: "PERHEXYNE 25B" manufactured by NOF CORPORATION); 2,5-dimethyl-2,5-di(benzoylperoxy)hexane; α,α'-bis(t-butylperoxy-m-isopropyl)benzene (example of a commercially available product: "PERBUTYL P" manufactured by NOF CORPORATION); t-butylperoxyisopropyl carbonate; and parachlorobenzoyl peroxide. Only one peroxide crosslinking agent may be used, or two or more peroxide crosslinking agents may be used in combination.

Examples of a co-crosslinking agent used in the peroxide crosslinking system include a compound capable of co-crosslinking with a radical (unsaturated polyfunctional compound) such as a triallyl isocyanurate (example of a commercially available product: "TAIC" manufactured by Mitsubishi Chemical Corporation); a triallyl cyanurate; a triallyl formal; a triallyl trimellitate; N,N'-m-phenylene bismaleimide; dipropargyl terephthalate; a diallyl phthalate; or a tetraallyl terephthalamide. Only one co-crosslinking agent may be used, or two or more co-crosslinking agents may be used in combination. Among the above, from the viewpoint of reactivity and heat resistance (compression set properties), the co-crosslinking agent preferably includes a triallyl isocyanurate.

In the triazine crosslinking system, a crosslinking catalyst such as an organotin compound, an onium salt such as a quaternary phosphonium salt or a quaternary ammonium salt, urea, or silicon nitride is used.

Examples of a crosslinking agent used in the oxazole crosslinking system include 2,2-bis(3-amino-4-hydroxyphenyl)hexafluoropropane (BOAP), 4,4'-sulfonylbis(2-aminophenol), and 9,9-bis(3-amino-4-hydroxyphenyl)fluorene. BOAP is preferably used.

As a crosslinking agent used in the imidazole crosslinking system and the thiazole crosslinking system, a conventionally known one can be used. Examples of a crosslinking agent used in the imidazole crosslinking system include 3,3',4,4'-tetraaminobenzophenone and 3,3'-diaminobenzidine.

The content of the crosslinking agent (when two or more are used, the total content thereof) in the crosslinkable rubber composition is, for example, 0.1 to 10 parts by mass, and preferably 0.2 to 5 parts by mass, and more preferably 0.3 to 3 parts by mass, per 100 parts by mass in total of the crosslinkable rubber component.

The content of the co-crosslinking agent (when two or more are used, the total content thereof) in the crosslinkable rubber composition is, for example, 0.5 to 10 parts by mass per 100 parts by mass in total of the crosslinkable rubber component, and from the viewpoint of improving heat resistance, preferably 1 to 8 parts by mass.

For the purpose of improving processability, adjusting a physical property, or the like, the crosslinkable rubber composition can include, as necessary, an additive such as an anti-aging agent, an antioxidant, a vulcanization accelerator, a processing aid (such as stearic acid), a stabilizer, a tackifier, a silane coupling agent, a plasticizer, a flame retardant, a release agent, a wax, or a lubricant. A further example of the additive is a tackiness reducing (preventing) agent such as a fluorine-based oil (for example, a perfluoroether). Only one additive may be used, or two or more additives may be used in combination.

However, for example, when the annular seal material is used in a high-temperature environment, volatilization, elution, or precipitation may occur, and thus the amount of the additive is preferably as small as possible (for example, 10 parts by mass or less, preferably 5 parts by mass or less, more preferably 2 parts by mass or less, and further preferably 1 part by mass or less per 100 parts by mass in total of the crosslinkable rubber component), and it is desirable not to contain any additive.

In addition, the crosslinkable rubber composition can, as necessary, include a filler (for example, a fluororesin, silica, alumina, zinc oxide, titanium oxide, clay, talc, diatomaceous earth, barium sulfate, calcium carbonate, magnesium carbonate, calcium oxide, mica, graphite, aluminum hydroxide, aluminum silicate, hydrotalcite, a metal powder, a glass powder, or a ceramic powder). Only one filler may be used, or two or more fillers may be used in combination. The content of the filler (when two or more are used, the total content thereof) in the crosslinkable rubber composition is, for example, 0.1 parts by mass or more and 40 parts by mass or less per 100 parts by mass in total of the crosslinkable rubber component, and from the viewpoint of improving mechanical strength, preferably 1 part by mass or more and 30 parts by mass or less, and more preferably more than 1 part by mass and 30 parts by mass or less. Herein, the filler is distinguished from the organic pigment and the inorganic pigment each as a colorant described above, and a type different from the organic pigment and the inorganic pigment can be used.

When the crosslinkable rubber composition includes a fluororesin filler, the ozone resistance and the mechanical strength of the crosslinked product can be further improved. The fluororesin can be contained in the crosslinkable rubber composition, for example, as a fluororesin particle.

The fluororesin used as a filler is a resin having a fluorine atom in the molecule, and examples thereof include polytetrafluoroethylene (PTFE), a tetrafluoroethylene-perfluoroalkyl vinyl ether copolymer (PFA), a tetrafluoroethylene-hexafluoropropylene copolymer (FEP), a tetrafluoroethylene-ethylene copolymer (ETFE), polychlorotrifluoroethylene (PCTFE), a chlorotrifluoroethylene-ethylene copolymer (ECTFE), polyvinylidene fluoride (PVDF), polyvinyl fluoride (PVF), a vinylidene fluoride-hexafluoropropylene copolymer (VDF-HFP copolymer), and a vinylidene fluoride-hexafluoropropylene-tetrafluoroethylene copolymer (VDF-HFP-TFE copolymer). Only one fluororesin may be used alone, or two or more fluororesins may be used in combination.

Among the above, a fluororesin having a relatively high melting point such as PFA or PTFE is preferably used from the viewpoint of preventing the resin from melting in a high-temperature environment to impair a property such as compression set.

The fluororesin used as a filler may contain a functional group. The functional group can be introduced, for example, by copolymerizing a monomer having the functional group. When the crosslinking site monomer is copolymerized as a monomer having a functional group, crosslinking between the fluororesin and the perfluoroelastomer also proceeds with the crosslinking agent, and thus it is possible to further improve the mechanical strength or the like of the crosslinked product of the perfluoroelastomer composition. An example of a fluororesin containing a functional group is a nitrile group-containing polytetrafluoroethylene disclosed in Japanese Patent Laying-Open No. 2013-177631. In addition, the fluororesin can also be a modified fluororesin such as "TFM modified PTFE" (manufactured by Dyneon).

When the crosslinkable rubber composition includes a perfluoroelastomer and a fluororesin filler, it is possible to use a fluororesin-containing perfluoroelastomer manufactured by, for example, 1) a method involving kneading a perfluoroelastomer powder and a fluororesin powder by using a mixing roll, 2) a method involving melt-kneading a perfluoroelastomer powder or pellet and a fluororesin powder or pellet by using an apparatus such as a mixer or a twin-screw extruder, or even 3) a method involving adding a fluororesin at the preparation stage of a perfluoroelastomer.

An example of method 3) above includes a method involving mixing an aqueous dispersion of a perfluoroelastomer and an aqueous dispersion of a fluororesin, each obtained by an emulsion polymerization method, followed by co-coagulation to obtain a mixture of the perfluoroelastomer and the fluororesin.

The crosslinkable rubber composition can be prepared by uniformly kneading a crosslinkable rubber component, a colorant, a crosslinking agent, and a co-crosslinking agent, a filler, and an additive added as necessary. As a kneading machine, a conventionally known kneading machine such as a mixing roll, a pressure kneader, or an internal mixer (Banbury mixer) can be used. The components blended may be mixed and kneaded at the same time, or may be kneaded in a plurality of stages such as first uniformly kneading the components other than a component that contributes to the crosslinking reaction (crosslinking accelerator, crosslinking retarder, crosslinking agent, or the like) among the components blended and then kneading the component that contributes to the crosslinking reaction.

<Method for Manufacturing Annular Seal Material>

The method for manufacturing the annular seal material can include, for example, the following steps.

1) A step of providing preforms including an uncrosslinked core made of a crosslinkable rubber composition for a core, and an uncrosslinked outer layer, made of a crosslinkable rubber composition for an outer layer, covering a periphery of the uncrosslinked core [hereinafter, also referred to as step 1)].

2) A step of placing the preform in a mold to carry out hot press molding [hereinafter, also referred to as step 2)].

The descriptions in the annular seal material described above are applied to the annular seal material, the crosslinkable rubber composition for a core, and the crosslinkable rubber composition for an outer layer.

The step 1) can include carrying out extrusion using a crosslinkable rubber composition for a core and a crosslinkable rubber composition for an outer layer. The preform provided in step 1) can be rope-like. The rope-like preform can be produced, for example, as follows. First, a crosslinkable rubber composition for a core and a crosslinkable rubber composition for an outer layer are shaped into a sheet by using a roll to produce a sheet-like shaped product. The thickness of the sheet-like shaped product may be, for example, 1 mm or more and 5 mm or less. Next, the sheet-like shaped product is cut into a ribbon-like shaped product having a width of, for example, 5 mm or more and 30 mm or less by using a cutting machine. After that, the ribbon-like shaped products of the crosslinkable rubber composition for a core and the crosslinkable rubber composition for an outer layer are fed into a screw type extruder equipped with a crosshead and extruded into a rope, thereby making it possible to obtain a rope-like preform having a two-layer structure consisting of an outer layer constituted of the crosslinkable rubber composition for an outer layer and a core constituted of the crosslinkable rubber composition for a core. The speed at which the ribbon-like shaped product is extruded into a rope can be, for example, 100 to 1000 mm/min.

The cross-sectional diameter of the rope-like preform may be, for example, 3 to 50 mm, and is preferably 3 to 15 mm. The outer layer thickness of the rope-like preform may be, for example, 0.1 to 10 mm, and is preferably 0.2 to 3 mm. The length of the rope-like preform may be, for example, 100 to 5000 mm.

In step 1), the ribbon-like shaped product may be produced by extruding the crosslinkable rubber composition for a core and the crosslinkable rubber composition for an outer layer into a ribbon by using a plunger type extruder, without producing a sheet-like shaped product.

In step 2), hot press molding may be feed press molding involving producing a straight or arcuate molded body from the rope-like preform by using a mold having a straight or arcuate cavity and connecting the end portions of this molded body to form the annular seal material, or the annular seal material may be produced by placing the rope-like preform in a mold having an annular cavity to carry out heat press molding. The heating temperature in hot press molding may be, for example, about 110° C. to 220° C.

The method for manufacturing the annular seal material can include a secondary crosslinking step for further crosslinking the crosslinkable rubber composition after step 2). The heating temperature in the secondary crosslinking step may be, for example, about 150° C. to 310° C.

In the method for producing the annular seal material according to the present invention, the crosslinkable rubber composition for a core and the crosslinkable rubber composition for an outer layer have a different color from each other after heating such as after hot pressing or after secondary crosslinking, and thus after step 2), protrusion of the core from the outer layer at a seam and a parting line tends to be easy to recognize.

EXAMPLES

Hereinafter, the present invention will be described in more detail with reference to Examples. Unless otherwise specified, "%" and "parts" in examples are % by mass and parts by mass, respectively.

Example 1

A perfluoroelastomer, PERHEXA 25B as a crosslinking agent, and TAIC as a crosslinking aid were blended and kneaded by using a kneader to produce a crosslinkable rubber composition for an outer layer. Next, a fluororubber, 0.1 parts by mass of a colorant (Cromphtal Violet D5700) per 100 parts by mass of the fluororubber, PERHEXA 25B as a crosslinking agent, and TAIC as a crosslinking aid were blended and kneaded by using a kneader to produce a crosslinkable rubber composition for a core. Next, the crosslinkable rubber composition for an outer layer and the crosslinkable rubber composition for a core were each shaped into a sheet by using a roll in such a way as to have a thickness of about 3 mm, and cut into a ribbon having a width of about 15 mm by using a cutting machine. The crosslinkable rubber composition for an outer layer and the crosslinkable rubber composition for a core each shaped into a ribbon were fed into a screw type extruder equipped with a crosshead to produce 5 rope-like preforms having a two-layer structure consisting of an outer layer made of the crosslinkable rubber composition for an outer layer and a core made of the crosslinkable rubber composition for a core. The rope-like preforms each had a cross-sectional diameter of about 7 mm, an outer layer thickness of about 1 mm, and a length of 800 mm.

Next, the 5 rope-like preforms were feed press molded at a temperature of 170° C. to produce an annular seal material. Next, the obtained annular seal material was subjected to secondary crosslinking at a temperature of 200° C. It was confirmed that the obtained annular seal material did not have protrusion of the core from the outer layer. The average ratio of the thickness of the outer layer to the cross-sectional diameter of the annular seal material was 1/7.

REFERENCE SIGNS LIST

1 Annular seal material; 2 Core; 3 Outer layer; T Thickness of outer layer; D Cross-sectional diameter.

The invention claimed is:

1. An annular seal material comprising a core and an outer layer covering an entire periphery of the core in a contiguous manner, wherein the core and the outer layer comprises a crosslinked product of a crosslinkable rubber composition having a different color from each other either after hot press molding or after secondary crosslinking or both, and wherein the annular seal material has a circular cross-sectional shape and has an average ratio of a thickness of the outer layer to the whole cross-sectional thickness of 1/50 to 1/3.

2. The annular seal material according to claim 1, wherein at least one of the core and the outer layer comprises a colorant.

3. The annular seal material according to claim 2, wherein the core comprises a colorant and the outer layer does not comprise a colorant.

4. The annular seal material according to claim 2, wherein the colorant is at least one selected from the group consisting of an inorganic pigment and an organic pigment.

5. The annular seal material according to claim 1, wherein the outer layer comprises a crosslinked product of at least one selected from the group consisting of a perfluoroelastomer and a fluororubber, and the core comprises a crosslinked product of at least one selected from the group consisting of a perfluoroelastomer, a fluororubber, silicone rubber, and fluorosilicone rubber.

6. A method for manufacturing the annular seal material according to claim 1, comprising:

providing a preform comprising an uncrosslinked core made of a crosslinkable rubber composition for a core, and an uncrosslinked outer layer, made of a crosslinkable rubber composition for an outer layer, covering an entire periphery of the uncrosslinked core in a contiguous manner; and placing the preform in a mold to carry out hot press molding, wherein the crosslinkable rubber composition for a core and the crosslinkable rubber composition for an outer layer have a different color from each other either after hot press molding or after secondary crosslinking or both.

7. The method for manufacturing the annular seal material according to claim 6, wherein the providing a preform comprises carrying out extrusion using the crosslinkable rubber composition for a core and the crosslinkable rubber composition for an outer layer.

8. The method according to claim 6, wherein the preform is rope-like.

* * * * *